United States Patent [19]

Trivette

[11] 4,376,189

[45] Mar. 8, 1983

[54] RUBBER COMPOSITIONS AND METHOD OF TREATING RUBBER

[75] Inventor: Chester D. Trivette, Akron, Ohio

[73] Assignee: Monsanto Company, St. Louis, Mo.

[21] Appl. No.: 322,141

[22] Filed: Nov. 17, 1981

[51] Int. Cl.³ .......................................... C08F 279/02
[52] U.S. Cl. .................................. 525/291; 524/219; 525/296
[58] Field of Search ...................... 525/291, 296, 374; 524/219

[56] References Cited

U.S. PATENT DOCUMENTS

| | | | |
|---|---|---|---|
| 2,989,504 | 6/1961 | Little | 260/62 |
| 3,225,100 | 12/1965 | Mullins et al. | 260/577 |
| 3,297,713 | 1/1967 | Ladd | 260/326.3 |
| 3,502,542 | 3/1970 | Wenisch | 161/216 |

OTHER PUBLICATIONS

J. Applied Polymer Science, vol. 8, pp. 2281-2298 (1964) "Vulcanization with Maleimides," P. O. Tawney, W. J. Wenisch, S. Van Der Burg, and D. I. Relyea.
Chemical Abstracts, vol. 81, 1974, 4619d—Diene Rubber Compositions with Improved Green Strength.
Chemical Abstracts, vol. 83, 1975, 29568r—Modifying Polyisoprene Rubbers.
Chemical Abstracts, vol. 83, 1975, 61259b—Isoprene Rubber Compositions Having Good Green Strength.
Chemical Abstracts, vol. 85, 1976, 22603f—Improvement of the Green Strength of Polyisoprene.

*Primary Examiner*—Paul R. Michl
*Attorney, Agent, or Firm*—Gordon B. Seward

[57] ABSTRACT

Rubber compositions comprising diene rubber and N-carbamoyl maleamic acid, N-thiocarbamoyl maleamic acid or derivatives thereof exhibit improved green strength or tack properties. Treatment of diene rubber above 130° C. with the same compounds is shown to be effective in obtaining rubber compositions of improved properties.

53 Claims, No Drawings

RUBBER COMPOSITIONS AND METHOD OF TREATING RUBBER

BACKGROUND OF THE INVENTION

This invention relates to improved diene rubber compositions and to a method of treating diene rubber with N-carbamoyl maleamic acid and derivatives thereof. The treatment is especially effective in increasing the tack and green strength of the diene rubber.

The introduction of synthetic diene rubber as a total or partial replacement for natural rubber in portions of pneumatic tires and other rubber articles presented problems in that the behavior of the synthetic materials differed from that of natural rubber. One significant area of difference concerned tack and green strength. Typically, unvulcanized synthetic diene rubber has significantly lower green strength and tack properties than does natural rubber. This difference has presented problems in that articles such as tires failed to maintain their structural integrity during handling and shaping prior to vulcanization. As a result, searching for improvements in the green strength and tack of rubber compounds containing synthetic rubber has been a continuing effort.

Synthetic polyisoprene has been produced which resembles natural rubber closely, consisting of essentially all cis-1,4-polyisoprene. Perhaps the most significant difference between synthetic polyisoprene and natural rubber is that the former has considerably less green strength and tack. Thus, much of the effort toward green strength and tack improvement concerns synthetic polyisoprene. Other synthetic diene rubbers which are widely used are polybutadiene and styrene-butadiene copolymer rubber (SBR).

Efforts to increase the tack and green strength of diene rubber include a variety of treatments such as the addition of a wide variety of resin tackifiers to synthetic rubber compounds. In general, these materials have been ineffective for the desired purpose, primarily because of the inherently lower green strength of the synthetic rubber polymers. U.S. Pat. Nos. 3,151,161 and 3,225,100 teach incorporation of nitrosoanilinoalkanes into rubber, and improvements in green strength have been realized in synthetic rubber thus treated. Problems of dispersion of these materials into rubber have been encountered, compounded by the fact that relatively low amounts are generally used.

SUMMARY OF THE INVENTION

It is an object of this invention to provide compositions comprising diene rubber which exhibit improved properties of green strength or tack, or both. It is another object of this invention to provide a method of treating diene rubber to improve its green strength or tack properties.

These and other objects are realized in the instant invention, first in a composition comprising diene rubber and containing a modifying amount of a compound of the formula

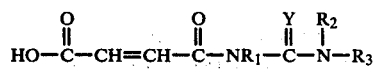

in which $R_1$, $R_2$, and $R_3$ are the same or different radicals selected from hydrogen, phenyl and alkyl of 1-10 carbon atoms, including cycloalkyl of 3-10 carbon atoms, optionally forming a heterocyclic moiety together with one or both of the N atoms of the formula, with or without an added hetero N or O atom and Y is a sulfur or oxygen atom.

The invention also includes a method of treating diene rubber which comprises treating the diene rubber at an appropriate temperature above 130° C. for a long enough time to impart to the diene rubber improved properties as to green strength or tack with a compound of the formula set forth above. The invention also includes the product of the above-described method.

The composition of the invention is described as comprising diene rubber. By diene rubber is meant an elastomer which is a polymer from diene monomer, either a natural or synthetic polymer, including mixtures of two or more natural or synthetic polymers. Natural diene rubber includes hevea rubber, in the form of smoked sheet, crepe or other typical forms, guayule, and other naturally occurring elastomers. Synthetic polymers which are included in the definition of "diene rubber" include polymers from isoprene and butadiene, either homopolymers or copolymers with one or more co-monomers, which can be dienes or other polymerizable materials. For example, copolymers of isoprene or butadiene with styrene, acrylonitrile, isobutylene, or unsaturated carboxy acids and esters such as maleic, fumaric, itaconic, acrylic and methacrylic acids, and methylmethacrylate are included. EPDM rubbers (polymer from ethylene, propylene and a non-conjugated diene monomer) are also included. The invention finds a particular usefulness in use with synthetic polyisoprene of a high cis-1,4 content, and blends thereof with styrene/butadiene copolymer rubber (SBR). In addition to the diene types mentioned, the composition can contain other compatible rubber materials and the rubber compounding ingredients normally incorporated into rubber compounds.

The compounds which are contained in the composition of the invention include N-carbamoyl maleamic acid (sometimes called maleuric acid), and related compounds. For example when Y in the general formula is oxygen, typical compounds include the products of the reaction of one mole of maleic anhydride with one mole of ethylurea, 1,3-dimethylurea, phenylurea, 2-imidazolidone, and the like. When Y in the general formula is a sulfur atom, typical compounds include, in addition to N-thiocarbamoylmaleamic acid, the reaction products of one mole of maleic anhydride with one mole, respectively, of phenylthiourea, ethylthiourea and the like.

A compound as defined in the general formula, or two or more of such compounds, is present in the composition of the invention in modifying amount. This amount can vary depending on the particular type of diene rubber present, the identity of the compound employed, the desired improvement, and other factors. Preferably, the amount of the compound present is from 0.1 to 15 parts, and more preferably 0.25 to 8 parts, and most preferably from 0.5 to 5 parts, by weight per 100 parts of diene rubber by weight. Optimum levels can easily be determined by a few simple experiments.

In the method of the invention the diene rubber, as defined above, is said to be "treated." Treatment of the diene rubber means incorporating the compound, as defined above, into the rubber, with good dispersion, and maintaining the mixture at the appropriate temperature (above 130° C.) for sufficient time to permit modification to occur. A convenient method of treating involves admixture of the compound into the rubber using the type of high-shear equipment normally used for mixing rubber compounds, such as rubber mills, and, preferably, internal mixers exemplified by Banbury mixers and the like. Such mixing produces a temperature rise in the rubber mixture which can be controlled within the desired temperature range. Alternatively, the compound can be incorporated into the diene rubber at a relatively low temperature (below 130° C.) and then the mixture can be heated to the appropriate higher temperature and held for the required time.

Treatment temperatures must exceed 130° C. or the desired improvements are not realized. Preferably, temperatures above 150° are used, more preferably above 160° and most preferably between 160° and 210° C.

Preferably, the treatment time will be from 0.1 to 20 minutes, more preferably between 0.5 and 15 minutes and most preferably between 1 and 10 minutes. Shorter treatment times than the preferred minimum can result in insufficient improvement in the desired properties, and longer treatment times than the preferred maximum can be harmful to the rubber. As with the levels of the components, both optimum times and optimum temperatures for a specific combination of ingredients can easily be determined by a limited number of experiments.

Other rubber compounding ingredients can optionally be present during the treatment, and the presence of carbon black and/or non-black fillers is preferred. Because of the conditions employed, however, the complete vulcanization system is preferably not present during the treatment, as it could result in a premature curing or scorch of the diene rubber compound. If it is desired to have non-black fillers present in the diene rubber compound, particular advantage is realized by having the fillers present during the treatment step. It has been found that this method produces interaction between the non-black filler and the diene rubber so as to obtain better physical properties in the vulcanized compounds. These better physical properties are evidenced in improvements in stress-strain properties, among other properties.

Often, when treating the diene rubber, amounts of the compound will be substantially less than the maximum preferred levels set forth above, such as, for example, less than three parts by weight per 100 parts of diene rubber by weight, however, higher amounts can be employed, especially if a "masterbatch" technique is used. This technique can involve treating only a portion of diene rubber, then subsequently blending the untreated portion into the treated portion. From ten parts or less up to 1,000 parts or more additional rubber can be admixed to the treated rubber, as desired. The additional rubber can be the same as, or different from the rubber originally treated. The masterbatch technique can be effective in providing more efficient use of the treating equipment, thus allowing higher throughput of rubber.

As mentioned above, the improvement of tack and green strength is of great practical importance. The nature of these two properties in uncured rubber compounds has been explored by a number of investigators. A review of recent developments was recently published, written by G. R. Hamed of the University of Akron, entitled "Tack and Green Strength of Elastomeric Materials," Rubber Chemistry and Technology, 54, pp. 576-595 (1981). This review brings out the basic fact that tack and green strength are interrelated. Tack has been defined as the ability of two materials to resist separation after bringing their surfaces into contact for a short time under a light pressure. Green strength in an elastomer is its resistance, before vulcanization, to deformation or fracture. Green strength can be determined independently, but tack is dependent to a certain degree on green strength.

In general, the compounds used in the composition and method of the invention can be produced by reacting maleic anhydride with urea, or thiourea or a substituted urea or thiourea in an acidic medium such as glacial acetic acid. The use of glacial acetic acid can be helpful to prevent addition across the double bond of the maleic anhydride molecule.

DETAILED DESCRIPTION

A more complete understanding of the invention may be realized by reference to the following examples, in which all parts are by weight, unless otherwise specified.

EXAMPLE I

N-carbamoylmaleamic acid, one of the preferred compounds used in the composition and method of the invention, is prepared as follows.

Into a three-neck flask having a three liter capacity are charged 500 g. (5.1 mole) maleic anhydride, 300 g. (4.99 mole) urea and 1,000 ml. glacial acetic acid. The flask is equipped with stirrer, heating mantle with thermostat, a thermometer and a condenser. The reaction mixture is stirred at 50° C. for 48 hours. The precipitate which forms is filtered, washed with 300 ml. acetone, and dried overnight at 60° C. The product is 606 g. of a white solid having a melting point of 164°-165° C. Calculated as N-carbamoyl maleamic acid, the yield is 76.6%.

In a similar manner, N-ethylcarbamoyl maleamic acid is prepared by charging 24.5 g. (0.25 mole) maleic anhydride and 22.0 g. (0.25 mole) ethyl urea together with 75 ml. glacial acetic acid into a three-necked flask equipped with stirrer, heating mantle with thermostat, a thermometer and a condenser.

A clear tan-colored solution results from which the volatiles are removed at 70° C. and 1 mm pressure. The yield is 54.8 g. of a crystalline solid, which is re-crystallized from ethyl acetate giving a white crystalline solid melting at 125°-127° C.

In a similar manner, equimolar amounts of phenylthiourea and maleic anhydride are reacted to produce phenylthiocarbamoyl maleamic acid, melting at 200°-202° C. Similarly, equimolar amounts of 2-imidazolidone and maleic anhydride react to produce a compound of the formula

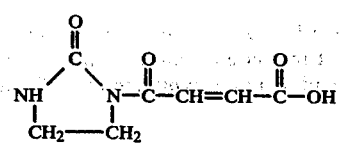

with a melting point of 154°-155° C.

The compounds thus made are mixed into rubber formulations and treated according to the method of the invention; then the rubber compounds are tested according to the accepted tests for green strength and tack, as follows.

Green strength measurements are performed using a standard tensile testing machine. Samples of the stock to be tested are pressed into slabs approximately three millimeters in thickness, from which slab specimens are die-cut measuring about 20.3×2.4 cm. The specimens are bench marked (to a test length of 2.54 cm.) in the center, and the exact width and thickness is measured. Specimens are pulled at a crosshead speed of 50.8 cm. per minute, with the stress recorded at desired levels of elongation up to 1200%, or break. Stress values are calculated based on the original cross-section area of each specimen; and the ultimate elongation value is also recorded.

Tack measurements are made using the Monsanto Tel-Tak instrument, as described in an article by J. R. Beatty in *Rubber Chemistry and Technology*, Vol. 42, No. 4, 1040 (1969). Fabric-backed rubber specimens are cut to a width of 6.35 mm and placed at right angles with each other to give a contact area of 0.403 cm.$^2$. A contact pressure of 227 grams is used for all tests, with a 30-second dwell time. Sample "stickiness" is measured by substituting a polished stainless steel surface for one specimen, and the result is subtracted from the tack value to give a "true tack" measurement. The units of these measurements are in grams per square centimeter, representing the maximum force per unit area required to separate the specimens, at a separation rate of 2.54 cm. per minute.

Cure characteristics are determined at the designated temperatures by means of the Monsanto Oscillating Disk Rheometer which is described by Decker, Wise and Guerry in Rubber World, December 1962, page 68. From the rheometer data, the minimum torque, R min., and the maximum torque, R max are recorded. The increase in torque is a measure of the degree of vulcanization and is proportional to the cross-link density. The time, $t_2$, minutes for a rise of two rheometer units above the minimum reading of the rubber sample and the time, $t_{90}$, required to obtain a torque of 90% of the maximum is recorded. The difference, $t_{90}-t_2$, is a measure of the cure rate of the sample. Vulcanizates are prepared by press curing at the selected temperature for the time indicated by the rheometer data to obtain optimum cure. The stress-strain properties of the vulcanizates are measured by conventional methods.

EXAMPLE II

The first compound prepared in Example I (N-carbamoyl maleamic acid) is combined in masterbatches as shown in Table I based on Natsyn 2200, a synthetic polyisoprene rubber, and the masterbatches are mixed and masticated in a laboratory Banbury mixer according to the following schedule:

1. Charge rubber and test compounds; mix 1 minute, controlling temperature between 150° and 154° C.
2. Charge ½ of carbon black; mix 1 minute.
3. Charge oil and remainder of carbon black; mix 1 minute.
4. Charge remaining ingredients; mix 1 minute.
5. Sweep down; mix 1 minute.
6. Dump. Actual rubber temperature (using probe) should be 170°–200° C.

Masterbatch A is a control with no treating agent. Masterbatch B contains a known treating agent, N-(2-methyl-2-nitropropyl)-4-nitrosoaniline, NITROL®, (33% on a carrier) used at its recommended level.

The data in Table I show that N-carbamoyl maleamic acid is effective in increasing substantially both the tack and green strength of synthetic polyisoprene.

EXAMPLE III

In order to evaluate the effect of the invention on fully compounded stocks, the masterbatches of Example II were further mixed with 2.5 parts of sulfur and 0.5 part of an accelerator (N-oxydiethylene-2-benzothiazole sulfenamide) by weight per 100 parts of rubber. Test results are set forth in Table II.

The data in Table II show that the effectiveness carries through in completely compounded stocks in the same manner as with the masterbatches. Slightly better physical properties result in the stocks treated according to the method of the invention as compared with the control (Stock 1).

TABLE I

| | Masterbatch | | | |
|---|---|---|---|---|
| | A | B | C | D |
| Polymer | | | | |
| Natsyn 2200 | 100 | → | → | → |
| Test Compounds | | | | |
| NITROL® | — | 0.75 | — | — |
| N—Carbamoyl maleamic acid | — | — | 1.0 | 1.0 |
| Other Ingredients | | | | |
| N-330 Carbon Black | 50.0 | → | → | → |
| Circosol 4240 Oil | 5.0 | → | → | → |
| Zinc Oxide | 5.0 | → | → | → |
| Stearic Acid | 2.0 | → | → | → |
| Antidegradant | 2.0 | → | → | → |
| Green Strength @ Room Temp., MPa Stress At: | | | | |
| 100% | 0.24 | 0.32 | 0.35 | 0.34 |
| 300% | 0.17 | 0.47 | 0.38 | 0.37 |
| 400% | 0.14 | 0.67 | 0.51 | 0.46 |
| U.E.*, % | >1200 | 560 | 690 | 720 |
| Tack, Monsanto Tel-Tak | | | | |
| Tack | 45 | 79 | 80 | 74 |
| Stickiness | 14 | 15 | 17 | 13 |
| "True" Tack | 31 | 64 | 63 | 61 |

*Ultimate Elongation

TABLE II

| | Stocks | | | |
|---|---|---|---|---|
| | 1 | 2 | 3 | 4 |
| Masterbatch A | 164.0 | — | — | — |
| Masterbatch B | — | 164.75 | — | — |
| Masterbatch C | — | — | 165.0 | — |
| Masterbatch D | — | — | — | 166.0 |
| Sulfur | 2.5 | → | → | → |
| Accelerator | 0.5 | → | → | → |
| Green Strength @ Room Temp., MPa Stress At: | | | | |
| 100% | 0.25 | 0.28 | 0.34 | 0.31 |
| 300% | 0.14 | 0.34 | 0.34 | 0.26 |
| 400% | 0.13 | 0.46 | 0.43 | 0.31 |
| U.E., % | >1200 | 630 | 720 | 810 |
| Tack, Monsanto Tel-Tak | | | | |
| Tack | 45 | 72 | 77 | 69 |
| Stickiness | 18 | 17 | 19 | 16 |
| "True" Tack | 27 | 55 | 58 | 53 |
| Rheometer Data @ 144° C. | | | | |
| $R_{max}$. | 71.6 | 73.5 | 76.8 | 76.0 |
| $R_{min}$. | 14.2 | 14.0 | 15.8 | 16.2 |
| $t_{90}$, minutes | 26.6 | 23.4 | 27.0 | 27.6 |
| $t_2$, minutes | 13.0 | 10.7 | 11.3 | 10.9 |
| $t_{90}-t_2$, minutes | 13.6 | 12.7 | 15.7 | 16.7 |
| Stress-Strain Data | | | | |
| Cure Time, min. @ 144° C. | 28 | 24 | 28 | 28 |
| $M_{300}$, MPa | 10.8 | 13.9 | 11.9 | 10.5 |
| Ultimate Tensile, MPa | 26.3 | 28.2 | 27.5 | 26.5 |

TABLE II-continued

|  | Stocks | | | |
|---|---|---|---|---|
|  | 1 | 2 | 3 | 4 |
| Ultimate Elongation, % | 580 | 530 | 580 | 590 |

TABLE III

|  | Masterbatch | | | |
|---|---|---|---|---|
|  | E | F | G | H |
| Polymer |  |  |  |  |
| Natsyn 2200 | 100.0 | → | → | → |
| Test Compounds |  |  |  |  |
| N—thiocarbamoyl maleamic acid | — | 1.0 | — | — |
| N—(Phenylthiocarbamoyl)-N—phenyl maleamic acid | — | — | 1.0 | — |
| N—Phenylthiocarbamoyl maleamic acid | — | — | — | 1.0 |
| Other Ingredients |  |  |  |  |
| N-330 Carbon Black | 50.0 | → | → | → |
| Circosol 4240 Oil | 5.0 | → | → | → |
| Zinc Oxide | 5.0 | → | → | → |
| Stearic Acid | 2.0 | → | → | → |
| Antidegradant | 2.0 | → | → | → |
| Green Strength @ Room Temp., MPa Stress At: |  |  |  |  |
| 100% | 0.37 | 0.39 | 0.41 | 0.36 |
| 300% | 0.37 | 0.40 | 0.46 | 0.37 |
| 400% | 0.41 | 0.46 | 0.52 | 0.42 |
| U.E., % | 820 | 790 | 720 | 840 |
| Tack, Monsanto Tel-Tak |  |  |  |  |
| Tack | 56 | 59 | 64 | 65 |
| Stickiness | 14 | 16 | 17 | 16 |
| "True" Tack | 42 | 43 | 47 | 49 |

EXAMPLE IV

Using a different sample of Natsyn 2200 polyisoprene, several thiourea derivatives are compared in the method of the invention.

Masterbatches are prepared in the same manner as in Example II, with data and test results shown in Table III.

The results in Table III show modest improvements in green strength and tack with thiourea derivatives in the method of the invention.

EXAMPLE V

In order to evaluate other compounds in the method of the invention, the following compounds were prepared, using techniques similar to those used in Example I:

| Identification | Formula |
|---|---|
| Ethylurea Derivative | $C_2H_5-NH-\overset{O}{\overset{\|}{C}}-NH-\overset{O}{\overset{\|}{C}}-CH=CH-\overset{O}{\overset{\|}{C}}-OH$ |
| Phenylurea Derivative | $\text{C}_6\text{H}_5-NH-\overset{O}{\overset{\|}{C}}-NH-\overset{O}{\overset{\|}{C}}-CH=CH-\overset{O}{\overset{\|}{C}}-OH$ |
| Imidazolidone Derivative | $\begin{array}{c}\text{HN}\diagdown\overset{O}{\overset{\|}{C}}\diagup\text{N}-\overset{O}{\overset{\|}{C}}-CH=CH-\overset{O}{\overset{\|}{C}}-OH\\ \|\quad\quad\|\\ CH_2-\!-\!-CH_2\end{array}$ |
| Dimethylurea Derivative | $CH_3-NH-\overset{O}{\overset{\|}{C}}-\overset{CH_3}{\overset{\|}{N}}-\overset{O}{\overset{\|}{C}}-CH=CH-\overset{O}{\overset{\|}{C}}-OH$ |

Using the method set forth in Example II, the above listed compounds were incorporated in the treatment of synthetic polyisoprene and the compounds were tested for green strength and tack as shown in Table IV.

TABLE IV

|  | Masterbatch | | | | |
|---|---|---|---|---|---|
|  | I | J | K | L | M |
| Polymer |  |  |  |  |  |
| Natsyn 2200 | 100.0 | → | → | → | → |
| Test Compounds |  |  |  |  |  |
| Ethylurea Derivative | — | 1.0 | — | — | — |
| Phenylurea Derivative | — | — | 1.0 | — | — |
| Imidazolidone Derivative | — | — | — | 1.0 | — |
| Dimethylurea Derivative | — | — | — | — | 1.0 |
| Other Ingredients |  |  |  |  |  |
| N-330 Carbon Black | 50.0 | → | → | → | → |
| Circosol 4240 Oil | 5.0 | → | → | → | → |
| Zinc Oxide | 5.0 | → | → | → | → |
| Stearic Acid | 2.0 | → | → | → | → |
| Antidegradant | 2.0 | → | → | → | → |
| Batch Temp. at Dump, °C. | 192 | 196 | 195 | 194 | 194 |
| Green Strength @ Room Temp., MPA Stress At: |  |  |  |  |  |
| 100% | 0.36 | 0.40 | 0.37 | 0.38 | 0.39 |
| 300% | 0.37 | 0.43 | 0.43 | 0.39 | 0.39 |
| 400% | 0.40 | 0.53 | 0.48 | 0.45 | 0.43 |
| U.E., % | 830 | 680 | 750 | 740 | 900 |
| Tack, Monsanto Tel-Tak |  |  |  |  |  |
| Tack | 56 | 58 | 55 | 57 | 53 |
| Stickiness | 13 | 16 | 19 | 20 | 19 |
| "True" Tack | 43 | 42 | 36 | 37 | 34 |

The data in Table IV show varying degrees of improvement in green strength over the control, with the ethylurea compound (Masterbatch J) showing best results. Tack increase was minimal at best with all test compounds.

The diene rubber of the invention has been shown to possess improved properties, especially improved green strength and tack. As a result of these improved properties, processing of the diene rubber is facilitated, and rubber objects such as tires, for example, which are fabricated from a plurality of components can be produced with greater speed and with fewer defects. The improved diene rubber of the invention thus is useful for hose, belts, and a variety of other rubber products in addition to tires.

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A composition comprising diene rubber containing a modifying amount of a compound of the formula

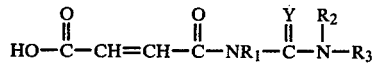

in which $R_1$, $R_2$, and $R_3$ are the same or different radicals selected from hydrogen, phenyl and alkyl of 1–10 carbon atoms, including cycloalkyl of 3–10 carbon atoms, optionally forming a heterocyclic moiety together with one or both of the N atoms of the formula, with or without an added hetero N or O atom, and Y is a sulfur or oxygen atom.

2. The composition of claim 1 wherein the compound is present in an amount of from 0.1 to 15 parts by weight per 100 parts of diene rubber by weight.

3. The composition of claim 2 wherein the compound is present in an amount of from 0.25 to 8 parts by weight per 100 parts of diene rubber by weight.

4. The composition of claim 3 wherein the compound is present in an amount of from 0.5 to 5 parts by weight per 100 parts of diene rubber by weight.

5. The composition of claim 4 wherein the diene rubber comprises polyisoprene.

6. The composition of claim 4 wherein the diene rubber comprises natural rubber.

7. The composition of claim 4 wherein the diene rubber comprises a blend of polyisoprene and a polymer from butadiene.

8. The composition of claim 5 wherein Y is a sulfur atom.

9. The composition of claim 8 wherein the compound is N-thiocarbamoyl maleamic acid.

10. The composition of claim 8 wherein the compound is N-phenylthiocarbamoyl maleamic acid.

11. The composition of claim 8 wherein the compound is N-(phenylthiocarbamoyl)-N-phenyl maleamic acid.

12. The composition of claim 5 wherein Y is an oxygen atom.

13. The composition of claim 12 wherein the compound is N-ethyl carbamoyl maleamic acid.

14. The composition of claim 12 wherein the compound is N-carbamoyl maleamic acid.

15. The composition of claim 12 wherein the compound is N-phenyl carbamoyl maleamic acid.

16. The composition of claim 14 which contains carbon black.

17. The composition of claim 14 which contains a non-black filler.

18. The composition of claim 17 which contains clay, talc, calcium carbonate or silica.

19. Method of treating diene rubber which comprises treating the diene rubber at an appropriate temperature above 130° C. for a long enough time to impart to the diene rubber improved properties as to green strength or tack with a compound of the formula

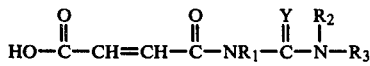

wherein $R_1$, $R_2$, and $R_3$ are the same or different radicals selected from
hydrogen,
phenyl and
alkyl of 1–10 carbon atoms, including cycloalkyl of 3–10 carbon atoms,
optionally forming a heterocyclic moiety with one or both of the N atoms of the formula, together with or without an added hetero N or O atom,
and
Y is a sulfur or oxygen atom.

20. The method of claim 19 wherein the treatment is performed for from 0.1 to 20 minutes at a temperature of at least 150° C. and the compound is present in an amount of from 0.1 to 15 parts by weight per 100 parts of diene rubber by weight.

21. The method of claim 20 wherein the treatment is performed of from 0.5 to 15 minutes at a temperature of at least 160° C. and the compound is present in an amount of from 0.25 to 8 parts by weight per 100 parts of diene rubber by weight.

22. The method of claim 21 wherein the treatment is performed for from 1 to 10 minutes at a temperature of from 160° to 210° C. and the compound is present in an amount of from 0.5 to 5 parts by weight per 100 parts of diene rubber by weight.

23. The method of claim 20 wherein the diene rubber comprises polyisoprene.

24. The method of claim 23 wherein Y is a sulfur atom.

25. The method of claim 24 wherein the compound is N-thiocarbamoyl maleamic acid.

26. The method of claim 24 wherein the compound is N-phenylthiocarbamoyl maleamic acid.

27. The method of claim 24 wherein the compound is N-(phenylthio)-N-phenylcarbamoylmaleamic acid.

28. The method of claim 23 wherein Y is an oxygen atom.

29. The method of claim 28 wherein the compound is N-ethyl carbamoyl maleamic acid.

30. The method of claim 28 wherein the compound is N-phenylcarbamoyl maleamic acid.

31. The method of claim 28 wherein the compound is N-carbamoyl maleamic acid.

32. The method of claim 21 wherein the polymer comprises polyisoprene and the compound is N-carbamoyl maleamic acid.

33. The method of claim 21 wherein the polymer comprises natural rubber and the compound is N-carbamoyl maleamic acid.

34. The method of claim 21 wherein the polymer comprises a polymer from butadiene and the compound is N-carbamoyl maleamic acid.

35. The method of claim 22 wherein the polymer comprises polyisoprene, and Y is an oxygen atom.

36. The method of claim 35 wherein carbon black is present.

37. The method of claim 35 wherein a non-black filler is present.

38. The method of claim 37 wherein the filler is clay, talc, calcium carbonate, silica or a mixture of two or more of them.

39. The method of claim 22 wherein the polymer comprises natural rubber and Y is an oxygen atom.

40. The method of claim 22 wherein the polymer comprises polymer from butadiene and Y is an oxygen atom.

41. The method of claim 35 wherein the compound is N-carbamoyl maleamic acid and carbon black is present.

42. The method of claim 35 wherein the compound is N-carbamoyl maleamic acid and a non-black filler is present.

43. The method of claim 42 wherein the filler is clay, talc, calcium carbonate, silica or a mixture of two or more of them.

44. The method of claim 22 wherein the polymer comprises polyisoprene and Y is a sulfur atom.

45. The method of claim 44 wherein the compound is N-thiocarbamoyl maleamic acid.

46. The method of claim 44 wherein the compound is N-phenylthiocarbamoyl maleamic acid.

47. The method of claim 44 wherein the compound is N-(phenylthio)-N-phenylcarbamoyl maleamic acid.

48. The method of claim 35 wherein the compound is N-ethylcarbamoyl maleamic acid.

49. The method of claim 35 wherein the compound is N-phenylcarbamoyl maleamic acid.

50. The method of claim 22 wherein the polymer is polyisoprene and the treatment comprises mastication.

51. The method of claim 22 wherein the polymer is polyisoprene, and the additional step of adding from 10 to 1000 parts by weight of untreated diene rubber per 100 parts diene rubber by weight.

52. The product of the method of claim 20.

53. The product of the method of claim 41.

* * * * *